US009183464B1

(12) United States Patent
Huang et al.

(10) Patent No.: US 9,183,464 B1
(45) Date of Patent: Nov. 10, 2015

(54) FACE ANNOTATION METHOD AND FACE ANNOTATION SYSTEM

(71) Applicant: National Taipei University of Technology, Taipei (TW)

(72) Inventors: Shih-Chia Huang, Taipei (TW); Ming-Kai Jiau, Taipei (TW); Yu-Hsiang Jian, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 14/339,469

(22) Filed: Jul. 24, 2014

(51) Int. Cl.
G06K 9/62 (2006.01)
G06K 9/00 (2006.01)
G06F 17/30 (2006.01)

(52) U.S. Cl.
CPC .......... *G06K 9/6259* (2013.01); *G06F 17/3028* (2013.01); *G06K 9/00288* (2013.01); *G06K 9/6293* (2013.01)

(58) Field of Classification Search
USPC .................. 382/115, 118, 156, 159, 278, 305; 340/5.81, 5.83
See application file for complete search history.

(56) References Cited

U.S. PATENT DOCUMENTS

| | | | | |
|---|---|---|---|---|
| 6,185,602 | B1* | 2/2001 | Bayrakeri | 709/204 |
| 6,640,145 | B2* | 10/2003 | Hoffberg et al. | 700/83 |
| 7,027,054 | B1* | 4/2006 | Cheiky et al. | 345/473 |
| 8,099,429 | B2* | 1/2012 | Deyo et al. | 707/776 |
| 8,165,916 | B2* | 4/2012 | Hoffberg et al. | 705/14.53 |
| 8,810,684 | B2* | 8/2014 | Chang | 348/231.1 |
| 2011/0106734 | A1 | 5/2011 | Boult et al. | |
| 2013/0300900 | A1 | 11/2013 | Pfister et al. | |

FOREIGN PATENT DOCUMENTS

| | | |
|---|---|---|
| TW | 201403492 | 1/2014 |
| TW | 201403503 | 1/2014 |

OTHER PUBLICATIONS

Yoav Freund, et al., "A Decision-Theoretic Generalization of On-Line Learning and an Application to Boosting," journal of computer and system sciences, vol. 55, No. 1, Aug. 1997, pp. 119-pp. 139.
Yanmin Sun, et al., "Cost-sensitive boosting for classification of imbalanced data," Pattern Recognition, vol. 40, No. 12, Dec. 2007, pp. 3358-3378.

(Continued)

*Primary Examiner* — Yosef Kassa
(74) *Attorney, Agent, or Firm* — Jianq Chyun IP Office

(57) ABSTRACT

A face annotation method and a face annotation system are provided. The face annotation method is adapted for a current owner to annotate contacts in online social networks. The face annotation method comprising: providing a pyramid database access control module which consists of a plurality of pyramid database units and performs a first batch of access control procedure and a non-first batch of access control procedure, wherein the pyramid database unit is constructed according to social relationship information; providing a multiple-kernel learning face recognition module implemented through the use of a MKL classifier unit which uses a MKL algorithm to achieve a face identification; and if the MKL-FR model is not able to identify query faces, providing a multiple-kernel learning face recognition fusion module to perform a collaborative face recognition strategy by utilizing a user who features a highest priority rule within a collaborative face recognition framework.

27 Claims, 8 Drawing Sheets

(56) References Cited

OTHER PUBLICATIONS

Yu-Hsiang Jian, et al., "Automatic Face Annotation System Used Pyramid Database Architecture for Online Social Networks," IEEE International Conference on Ubiquitous Intelligence and Computing (IEEE UIC 2013), Dec. 18-20, 2013, pp. 685-pp. 690.

Hsu et al., "An Automatic Face Annotation System Featuring High Accuracy for Online Social Networks," 2013 IEEE 10th International Conference on Ubiquitous Intelligence and Computing and 10th International Conference on Autonomic and Trusted Computing, Dec. 18-21, 2013, pp. 163-169.

"Office Action of Taiwan Counterpart Application", issued on Jul. 8, 2015, p. 1-p. 16.

\* cited by examiner

FACE ANNOTATION METHOD AND FACE ANNOTATION SYSTEM

BACKGROUND OF THE INVENTION

1. Field of the Invention

The present invention generally relates to face annotation techniques, in particular, to a face annotation method and a face annotation system employed within a collaborative framework and a multiple-kernel learning algorithm.

2. Description of Related Art

Over the past decade, the rapid development of digital capturing devices and handheld electronic products has led to a dramatically and continually increasing number of photographs that can be captured at any place and any time. A large proportion of these photographs contain face images which are associated with the daily lives of the photographers who captured them. This has given rise to interest in developing a face recognition system by which to determine the identities of people featured in photographs. Currently, online social networks (OSNs) such as Facebook and MySpace are a prevailing platform on which people communicate with their close friends, family members, and colleagues in the real world. Therefore, research conducted in the area of face recognition has been oriented towards a new service, called face annotation, for the purpose of management and entertainment in regard to social network platforms.

The research field of face annotation techniques can be classified into three approaches: manual, semi-automatic, and automatic. Manual face annotation is the act of annotating identities of individuals or subjects in personal photographs. However, annotation of a large number of uploaded photographs is a time-consuming and labor-intensive task. In effort to improve this situation, semi-automatic face annotation has become a popular approach in the last few years. This technique requires interaction and feedback from users in order to determine the identity label of a given query face in a photograph. While these manual operation procedures are practical for the purposes of face annotation, they still require substantial amounts of user-time. To lessen the need for manual operation and thereby reduce time consumption, the development of automatic face annotation approaches has recently become a prominent research area. This technique automatically determines the identity of subjects in photographs.

To identify faces in personal photographs, the kernel face recognition (FR) engines can be divided into two major systems: single FR classifier and multiple FR classifiers. The single FR classifier system tends to fail at face identification under uncontrolled condition, whereas the multiple FR classifier system is able to achieve practical application in uncontrolled conditions by means of combining a set of single classifiers to obtain accuracy which is superior to that of the single classifier system. Recently, a face annotation approach which uses a collaborative FR framework has been proposed previously. This approach utilizes the three characteristics such as socialization, personalization, and distribution of OSNs to effectively select and merge a set of personalized FR classifiers which belong to members who have close relationships with a particular owner. Nevertheless, an automatic face annotation system which uses a collaborative FR framework is excessively time-consuming because execution time significantly rises when the number of selected FR classifiers increases to the range of 10 to 91.

Accordingly, how to efficiently and accurately achieve highly reliable face annotation results has become an essential topic to researchers for the development of face annotation techniques in OSNs.

SUMMARY OF THE INVENTION

The present invention is directed to a novel collaborative face recognition algorithm by which to produce a high-efficiency and high-accuracy automatic face annotation system for personal photographs shared on online social networks.

In an embodiment of the invention, a face annotation method adapted for a current owner to annotate contacts in online social networks (OSNs) is provided. The face annotation method comprising: providing a pyramid database access control (PDAC) module which consists of a plurality of pyramid database units and performs a first batch of access control procedure and a non-first batch of access control procedure, wherein the pyramid database unit includes a plurality layers of database and is constructed according to social relationship information; providing a multiple-kernel learning face recognition (MKL-FR) module of the current owner implemented through the use of a MKL classifier unit which uses a MKL algorithm to achieve a face identification, wherein the MKL classifier unit is trained with the pyramid database unit accessed in OSNs and includes an offline learning procedure and an online recognition procedure; and if the MKL-FR model is not able to identify query faces, providing a multiple-kernel learning face recognition fusion (FRF) module to perform a collaborative face recognition strategy by utilizing a user who features a highest priority rule within a collaborative face recognition framework based on characteristics of OSNs.

In another embodiment of the invention, a face annotation system for a current owner to annotate contacts in online social networks (OSNs) is provided. The face annotation system comprising: a pyramid database access control (PDAC) module and a multiple-kernel learning face recognition (MKL-FR) module. If the MKL-FR model is not able to identify query faces, the face annotation system further includes a multiple-kernel learning face recognition fusion (FRF) module. The PDAC module consists of a plurality of pyramid database units and performs a first batch of access control procedure and a non-first batch of access control procedure, wherein the pyramid database unit includes a plurality layers of database and is constructed according to social relationship information. The MKL-FR module of the current owner implemented through the use of a MKL classifier unit uses a MKL algorithm to achieve a face identification, wherein the MKL classifier unit is trained with the pyramid database unit accessed in OSNs and includes an offline learning procedure and an online recognition procedure. The FRF module performs a collaborative face recognition strategy by utilizing a user who features a highest priority rule within a collaborative face recognition framework based on characteristics of OSNs.

In light of the foregoing, the face annotation method and the face annotation system are based on the collaborative face recognition strategy which utilizes a user who features a highest priority rule and involves three modules: the PDAC module, the MKL-FR module, and the FRF module. The personalized pyramid database units for each member in the PDAC Control module are constructed by effectively making use of various types of social network context to drastically reduce time expenditure and further boost the accuracy of face identification. The personalized MKL classifier unit is trained and optimized for each member of the distributed OSN, which utilizes the multiple kernel learning algorithm to locally adapt to each member, resulting in the production of high-quality face identification results for the current owner in the MKL-FR module. In order to achieve highly reliable face annotation results, the FRF module is proposed within the collaborative framework by which to efficiently select the proper personalized MKL classifier units via temporal-group context.

Subsequently, the multiple results of the personalized MKL classifier units are effectively fused into one highly reliable face annotation result in the distributed OSN.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
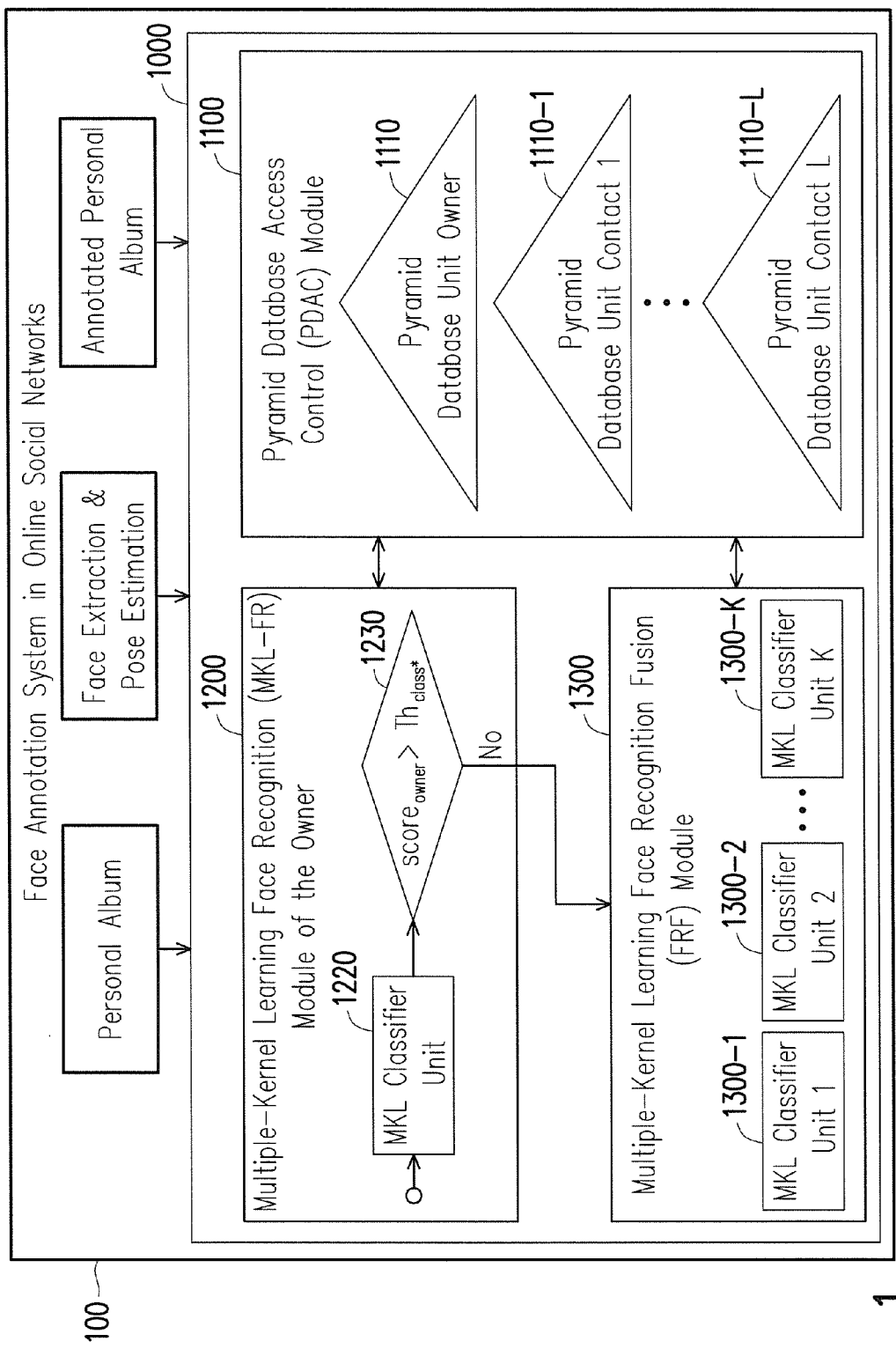
FIG. 1 is a block diagram illustrating a face annotation system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

To implement a high-accuracy automatic face annotation system with low time expenditure requirements on distributed online social networks (OSNs), the present embodiment provides a novel face annotation method based on a collaborative face recognition algorithm, and involves three modules: a Pyramid Database Access Control (PDAC) module, a Multiple-Kernel Learning Face Recognition (MKL-FR) module, and a multiple-kernel learning Face Recognition Fusion (FRF) module.

FIG. 1 is a block diagram illustrating a face annotation system 100 according to an embodiment of the invention. With reference to FIG. 1, the collaborative face recognition algorithm in OSNs 1000 is implemented by a PDAC module 1100, a MKL-FR module 1200, and a FRF module 1300. The establishment of the collaborative face recognition framework for the current owner involves L+1 personalized pyramid database units 1110-1~1110-L, and corresponding L+1 Multiple Kernel Learning (MKL) classifier units (not shown). In other words, the current owner has one personalized pyramid database unit 1110 and its corresponding MKL classifier unit 1220, while L different pyramid database units and the corresponding L MKL classifier units belong to different L contacts of the current owner. Herein, the L+1 different personalized pyramid database units 1110-1~1110-L and the corresponding L+1 MKL classifier units may be shared on OSNs within the collaborative face recognition framework.

Specifically, the PDAC module 1100 consists of distributed pyramid database units and two procedures including the First Batch of Access Control procedure and the Non-First Batch of Access Control procedure. Herein, the PDAC module 1100 forming a multi-layer pyramid database architecture for each member is based on social relationships with high contextual dependence. This is accomplished by exploiting various types of social network context, including the temporal context, the group context, the recurrence context, and the temporal-group context belonging to each member. Furthermore, the PDAC module 1100 offers the MKL classifier unit 1220 in the MKL-FR module 1200 to efficiently match fewer identities that have higher probabilities of being correct. As such, the application of the MKL-FR module 1200 can substantially reduce the time required, as well as improve the accuracy of face identification.

The MKL-FR module 1200 uses two procedures, an offline learning procedure and an online recognition procedure, to acquire face identification results with optimal accuracy. Through the utilization of these two procedures, effective face identification results which are based on a multiple-kernel learning algorithm can be obtained by the dynamic determination of a set of optimal kernel weights followed by the combination of multiple various kernel functions locally adapted to the current owner.

The FRF module 1300 is configured to boost the face annotation accuracy. Herein, the FRF module 1300 selects the proper MKL classifier units 1300-1~1300-K by utilization of temporal-group context. Then, the FRF module 1300 adeptly fuses the results of the multiple face identification by employing a user of the highest priority, and thus produces highly reliable results in distributed OSNs.

Details of the PDAC module 1100, the MKL-FR module 1200, and the FRF module 1300 are described below.

Figure 2A:
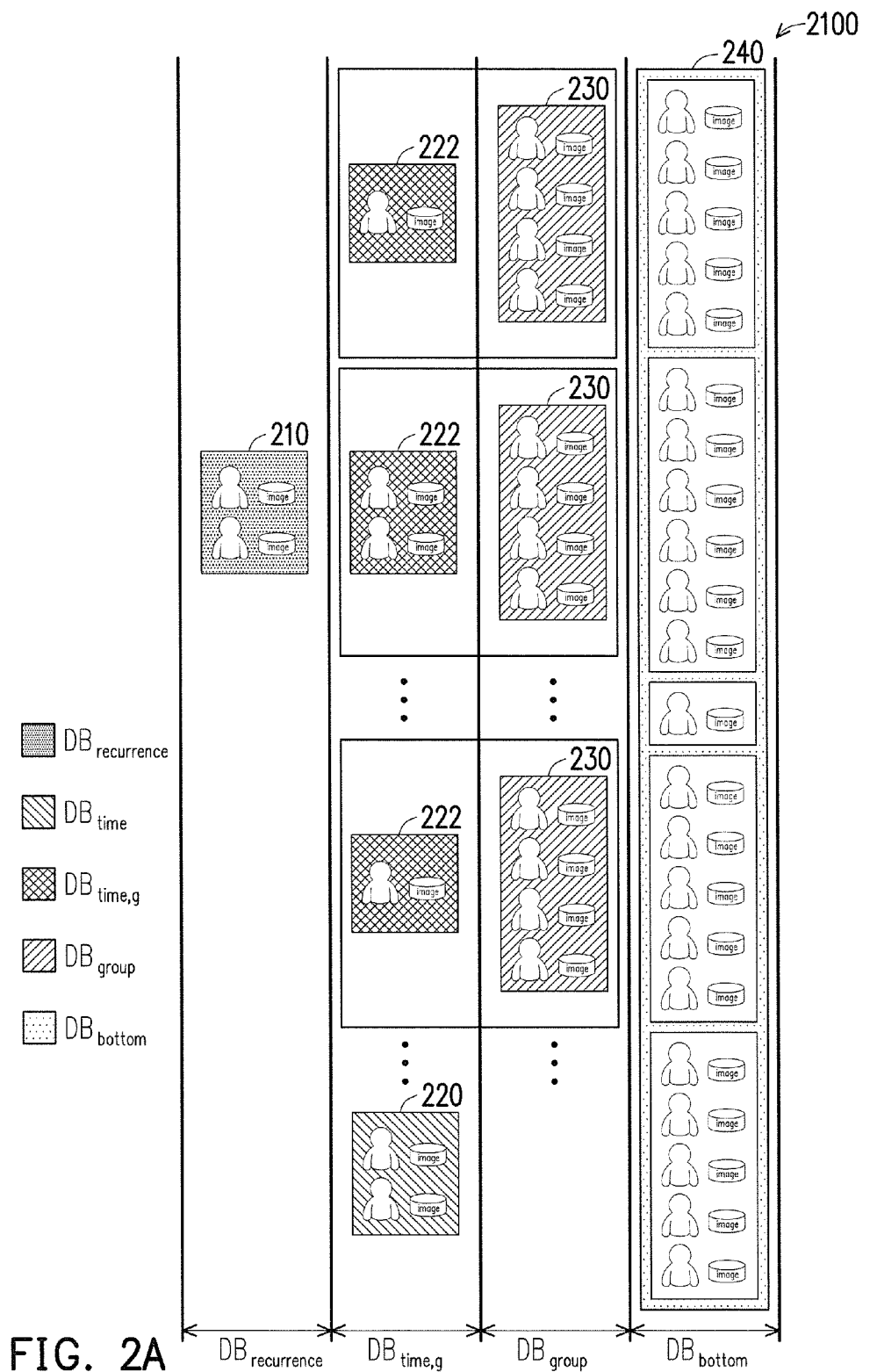
FIG. 2A is a schematic diagram illustrating one personalized pyramid database unit of the PDAC module according to an embodiment of the invention.

A. Pyramid Database Access Control Module (1) Pyramid Database Unit:

FIG. 2A is a schematic diagram illustrating one personalized pyramid database unit of the PDAC module 1100 according to an embodiment of the invention. With reference to FIG. 2A, by using social relationships with a high-dependence characteristic, the personalized pyramid database unit 2100 is constructed to allow for efficient identity matching primarily via the four different types of social network context information including recurrence context, temporal context, group context, and temporal-group context (see TABLE I).

TABLE I

| Database Type | Types of Context | Description of High-Dependence Social Relationship |
|---|---|---|
| $DB_{recurrence}$ | Recurrence Context | Recurrence means that people occur in photos more than once and may well recur within short time period. It is likely that the same individuals will reappear several times within the same set of photographs. |
| $DB_{time}$ | Temporal Context | A stronger and more recent connection between a member and the owner will result in a higher probability that the member will frequently appear in photographs belonging to that owner. |
| $DB_{group}$ | Group Context | Group context examines the interdependent behavior of many individuals with higher degrees of dependence in social organizations such as homes, schools, and societies. For example, individuals in the same organization tend to have mutual interests or appear together in the specific activities. Therefore, if members who are participants in specific groups appear in certain photos, then it is conjectured that there is a high probability that the other members from the rest of this group will appear in these photos. |
| $DB_{time,g}$ | Temporal-Group Context | The interdependent behavior of individuals who are in an intra-group organization is often associated with temporal effects. Thus, temporal-group context is defined as an extension of group context which |

TABLE I-continued

| Database Type | Types of Context | Description of High-Dependence Social Relationship |
|---|---|---|
| | | incorporates temporal dependence. Consequently, it is assumed that a small number of members in a specific group who interact frequently with an owner would be likely to appear in personal photographs possessed by that owner during a recent period of time relative to others in the same group. |

In order to construct the personalized pyramid database unit 2100, two steps are required: evaluation of the normalized connection score and selection of suitable identities. This pyramid database unit 2100 contains four layers of database: the first layer $DB_{recurrence}$ 210 which is based on recurrence context, the second layer ($DB_{time}$ 220$\cup DB_{time,g}$ 222), which is based on temporal context or temporal-group context, the third layer $DB_{group}$ 230 which is based on group context, and the fourth layer $DB_{bottom}$ 240 which contains all face images of the set of L+1 members, including the current owner.

Let $PDU=\{\Omega_{l\text{-}lyer}\}_{l=1}^{4}$ be an identity label set of a personalized pyramid database unit 2100, and a set of quartet can be represented as $\{\Omega_{l\text{-}lyer}\}_{l=1}^{4}=\{\Omega_{recurrence}, (\Omega_{time}\cup\Omega_{time,g}), \Omega_{group}, \Omega_{bottom}\}$, and $\{\Omega_{l\text{-}lyer}\}_{l=1}^{4}$ denotes the composition of the identity label subset of $DB_{recurrence}$ 210, ($DB_{time}$ 220$\cup DB_{time,g}$ 222), $DB_{group}$ 230, and $DB_{bottom}$ 240, respectively. Let $\Omega=\{FI_{q,p}|p\in P\}_{q=1}^{N_Q}$ be a query set composed of $N_Q$ unlabeled face images extracted from the set of personal photographs uploaded by the current owner, wherein $FI_{q,p}$ denotes the qth face image with a particular pose index p estimated by the face detection algorithm as shown in FIG. 1, and $P=\{P_1 \ldots P_{NP}\}$ represents the pose set including $N_P$ multiple pose indices.

In the whole identity label set PDU, each identity label subset can be established as shown by the following. The identity label subset $\Omega_{recurrence}$ is constructed by making use of the recurrence context. When a person occurs in the query set Q and it is expected that there is a very strong possibility that the same person will reoccur within the same query set Q. Thus, $\Omega_{recurrence}$ is set to the identity label subset with the highest priority dispatch in PDU. Furthermore, the identity label subset $\Omega_{recurrence}$ is continuously updated by the correct results obtained from face identification after each procedure in the PDAC module 1100.

The identity label subset $\Omega_{bottom}=\{1_{onwer}, 1_l, \ldots, 1_L\}=\{\Omega_g\}_{g=1}^{G}$ contains the current owner and his/her L contacts by using a contact list accessed from the community of the current owner, after which $DB_{bottom}$ 240 can be grouped into G groups to support the subsequent construction of other layers of the database by employing a group list of the owner. Herein, in order to increase the efficiency of face identification, $DB_{bottom}$ 240 is defined as the identity label subset with the lowest priority dispatch in the whole identity label set PDU.

The specific groups (g=g1, g2 . . . gk) can be acquired after the First Batch of Access Control procedure, yielding the identity label subset $\Omega_{group}=\{\Omega_g\}_{g=g1}^{gk}$ which is based on the group context and includes identities corresponding to these specific groups from $\Omega_{bottom}$.

In order to construct the identity label subsets $\Omega_{time}$ and $\Omega_{time,g}$, the selection of suitable identities is critical and based on the existence of temporal context and temporal group context obtained from personal collections of the current owner. In order to select suitable identities for the construction of $\Omega_{time}$ and $\Omega_{time,g}$, the strength of social relationships between all members $\{1_l, \ldots, 1_L\}$ and the current owner $1_{owner}$ during a recent period of time is quantified, which is defined in advance as the connection strength by means of a normalized connection score evaluation (see Equation (1) below). Herein, all photo collections which contain $N_A$ personal photographs accessed in the OSN community of the current owner is denoted as A, and the photo collections of the current owner which contain $N_{Aowner}$ personal photographs is denoted as $A_{owner}\square A$.

For the first step, the strength of recent social relationships between each OSN member $\{(1_n\}_{n=1}^{L}$ and the current owner $1_{owner}$ are evaluated, and the connection score ($CS_n$) is normalized as follows:

$$CS_n(l_n, l_{owner} | \Delta t) = \frac{C_n - C_{min}}{C_{max} - C_{min}} \forall n \quad \text{Equation (1)}$$

wherein the connection score $C_n=\exp(E(l_n, l_{owner}|\Delta t))\forall n$, $C_{max}$ and $C_{min}$ denote the maximum and minimum of all connection scores $C_n$(n=1, . . . , L). As shown above, $E(l_n, l_{owner}|\Delta t)$ reflects the connection strength between people during the recent time period $\Delta t$, and is evaluated by incorporating two main considerations expressed as follows:

$$E(l_n,l_{owner}|\Delta t)=\phi_1(l_n,l_{owner}|\Delta t)+\phi_2(l_n,l_{owner}|\Delta t) \quad \text{Equation (2)}$$

To obtain $E(l_n, l_{owner}|\Delta t)$, the unidirectional connection function $\phi_1$ and the bidirectional connection function $\phi_2$ are estimated by the following considerations. First, the unidirectional connection function $\phi_1$ estimates the distribution of likelihoods of each contact $\{l_n\}_{n=1}^{L}$ occurring in $N_{Aowner|\Delta t}$ recent personal photographs of the current owner $l_{owner}$. Second, the bidirectional connection function $\phi_2$ estimates the distribution of likelihoods of each contact $\{l_n\}_{n=1}^{L}$ and the current owner $l_{owner}$ co-occurring in $N_{A|\Delta t}$ recent personal photographs in the entire OSN. The unidirectional connection function $\phi_1$ and the bidirectional connection function $\phi_2$ are denoted in the following form:

$$\phi_1(l_n, l_{owner} | \Delta t) = \frac{\delta_1}{N_{A_{owner}|\Delta t}}\left(\sum_{photo\in A_{owner}|\Delta t} IND_1(l_n, photo)\right)\forall n \quad \text{Equation (3)}$$

$$\phi_2(l_n, l_{owner} | \Delta t) = \frac{1-\delta_1}{N_{A|\Delta t}}\left(\sum_{photo\in A|\Delta t} IND_2(l_n, l_{owner}, photo)\right)\forall n \quad \text{Equation (4)}$$

wherein $IND_1$ is a single-wise indicator function that returns 1 when the identity $l_n$ of the nth contact is labelled in personal photographs photo $\in(A_{owner}|\Delta t)$; otherwise, it returns 0; $IND_2$ is a pair-wise indicator function that returns 1 when both of the current owner $l_{owner}$ and the identity $l_n$ of the nth contact are labelled in personal photographs photo $\in(A|\Delta t)$; otherwise, it returns 0; $\Delta t$ represents the time at which photo was posted on the OSN during the recent time period; $\delta_1 (0\le\delta_1\le1)$ is the parameter of distribution adjustment of likelihoods; finally, $\delta_1$ and $1-\delta_1$ reflect the importance of occurrence and co-occurrence, respectively.

In the second step of the PDAC module 1100, when all identities of the larger-size specific identity subset have been sorted in accordance with their normalized connection scores, an appropriate number of selected identities from the larger-size specific identity subset to generate the smaller-size identities in $\Omega_{time}$ and $\Omega_{time.g}$ are determined based on the proposed optimum threshold by exploiting social network context types associated with temporality, such as temporal context and temporal-group context. A suitable identity is specifically selected from a larger-size specific identity subset and forwarded to the smaller-size specific identity subset when its normalized connection score is higher than an optimum threshold $Th_{CS}$ (see Equation (5) below). The selected identity is consequently regarded as a contact with a strong connection in a social relationship.

The previous optimum connection score $CS_{pred}^{\Delta t-1}$ and the current average connection score $CS_{mean}^{\Delta t}$ are integrated with the optimum threshold $Th_{CS}$, which is calculated as follows:

$$TH_{CS}=\delta_2 \cdot CS_{pred}^{\Delta t-1}+(1-\delta_2)CS_{mean}^{\Delta t} \quad \text{Equation (5)}$$

wherein the parameter $\delta_2 (0 \leq \delta_2 \leq 1)$ is empirically adjusted to have an important influence on the previous optimum connection score $CS_{pred}^{\Delta t-1}$, which is predicted according to the previous statistics updated from past social network context. Furthermore, the previous optimum connection score $CS_{pred}^{\Delta t-1}$ is predicted via the historical statistics derived from social network context related to temporality over the previous time period $\Delta t-1$, and is attained as follows:

$$CS_{pred}^{\Delta t-1}=CS_{opt}^{\Delta t-1}(1+\beta^{\Delta t}) \quad \text{Equation (6)}$$

wherein the actual optimal threshold $CS_{pred}^{\Delta t-1}$ can be given by the historical statistics derived from social network context related to temporality over the previous time period $\Delta t-1$, and the variance ratio $$\beta^{\Delta t} = \frac{CS_{median}^{\Delta t} - CS_{median}^{\Delta t-1}}{CS_{median}^{\Delta t-1}}$$

is defined as the ratio of variance of the median score of all normalized connection scores between the recent time period t and the previous time period $\Delta t-1$. On the other hand, $$CS_{median}^{\Delta t} = \frac{\sum_{n=1}^{N_{I|\Delta t}} CS_n}{N_{I|\Delta t}}$$

represents the average value over all normalized connection scores in the larger-size specific identity label subset, such as example $\Omega_{group}$ and $\Omega_{bottom}$; $CS_{mean}^{\Delta t}$ reflects the current trends of overall normalized connection scores; $N_{I|\Delta t}$ denotes the total number of identities in the larger-size specific identity label subset during the recent time period $\Delta t$.

Since there is usually only a small set of members in the specific group that consistently interacts with the owner, it is highly probable that these same members appear in personal photographs possessed by the owner during the recent period of time, relative to others in the same group. Hence, temporal-group context can be used to more reliably determine the probability of occurrence within a single set of photographs than by using group context alone. For this reason, the priority dispatch of these identity label subsets $\Omega_{time.g}$ and $\Omega_{group}$ are determined as $2^{nd}$ and $3^{th}$ in descending order, with which the probability of identities occurring within the query set Q attempts to produce an efficient pyramid database unit.

Figure 2B:
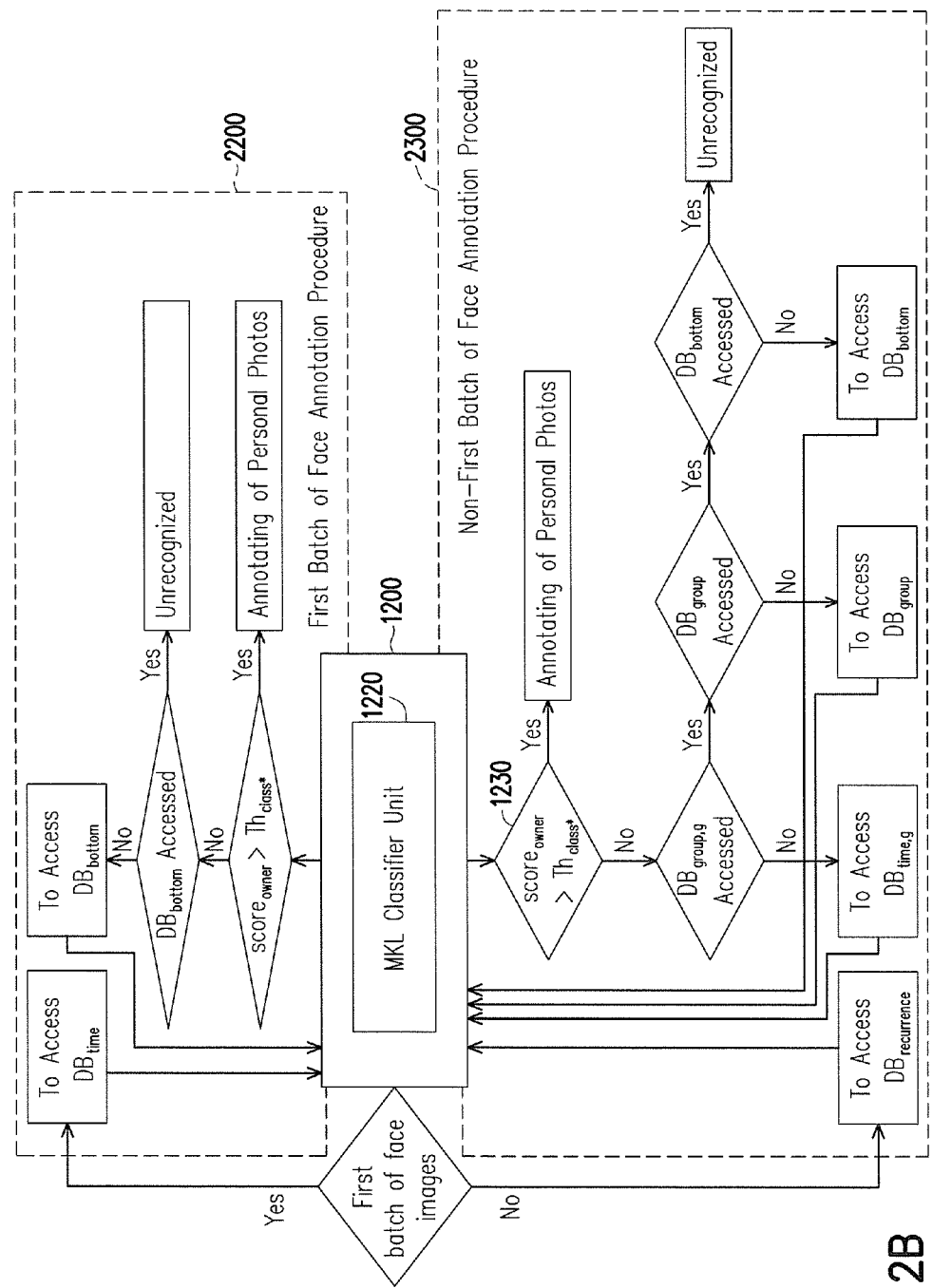
FIG. 2B is a schematic flowchart illustrating a First Batch of Access Control procedure and a Non-First Batch of Access Control procedure of the PDAC module according to an embodiment of the invention.

(2) First Batch of Access Control Procedure:

FIG. 2B is a schematic flowchart illustrating a First Batch of Access Control procedure and a Non-First Batch of Access Control procedure of the PDAC module 1100 according to an embodiment of the invention. With reference to FIGS. 2A and 2B, the First Batch of Access Control procedure 2200 containing the first batch of query face images enables the following MKL classifier unit 1220 to access a specific layer of the constructed pyramid database unit 2100 in the following order of priority: $DB_{time}$ 220 and $DB_{bottom}$ 240.

More specifically, match set R of all face images belonging to the identity label subset $\Omega_{time}$ is first accessed and forwarded to the following MKL classifier unit 1220 of the current owner for face identification. After the results of face identification are returned, the score vector $score_{owner}$ will be determined (denoted as 1230 in FIG. 1 and FIG. 2B). If it exceeds a certain threshold $Th_{class*}$, corresponding to the recognized class class*, the access control $AC_{first}$ is labelled with 1, which indicates that the identity of corresponding query face images needs to be annotated as correctly recognized. Otherwise, the access control $AC_{first}$ is labelled with 0, which indicates that the First Batch of Access Control procedure 2200 must provide the following MKL classifier unit 1220 of the current owner with match set R of face images of the next layer identity label subset that has been constructed to identify query faces again, namely $\Omega_{bottom}$. Herein, the threshold $Th_{class*}$ is a threshold belonging to the certain recognized identity in which each threshold which corresponds to a unique identity is calculated by the learned classifier. This is accomplished via each decision boundary belonging to a unique identity which is based on misclassification by the learning set. However, if the identity label subset $\Omega_{bottom}$ has been accessed by this procedure and the access control $AC_{first}$ is still labeled with 0, then the misclassified query face images are defined as unrecognized. After completion of the face annotation process, the query subset $Q'_1$ that has been annotated and its corresponding identity label subset are simultaneously submitted to $DB_{recurrence}$ 210 and acquire the specific groups (g=g1, g2, . . . , gk) mapped to these identities. Accordingly, the specific database layers—i.e., $DB_{recurrence}$ 210, $DB_{time.g}$ 222 and $DB_{group}$ 230—are achieved through the First Batch of Access Control procedure 2200.

(3) Non-First Batch of Access Control Procedure:

After the First Batch of Access Control procedure 2200 is performed at the beginning of the PDAC module 1100, the personalized pyramid database unit 2100 is completely generated. To enable the following MKL-FR module 1200 to focus on efficiently identifying query faces with the relatively fewer identities that have high probabilities of being correct, the Non-First Batch of Access Control procedure 2300 is configured to support the personalized pyramid database unit 2100.

When the remaining query subset $Q'_2$ composed of the remainder of unlabeled face images is determined, the Non-First Batch of Access Control procedure 2300 allows the following MKL classifier unit 1220 to access a specific layer of the entire pyramid database unit 2100 in the following order of priority: $DB_{time}$ 220, $DB_{time.g}$ 222, $DB_{group}$ 230 and $DB_{bottom}$ 240.

Next, the Non-First Batch of Access Control procedure 2300 is executed similarly to the First Batch of Access Control procedure 2200 to provide the match set R and forwarded to the following MKL classifier unit 1220 of the current owner. When the recognized classes class* are returned, the corresponding access controls $AC_{non-first}$ are labelled with 1, denoting that the acquired query identity labels are the correct results; otherwise, the corresponding access controls $AC_{non-first}$ are still labelled with 0. After $DB_{recurrence}$ 210, $DB_{time.g}$ 222 and $DB_{group}$ 230 have been accessed, the provided match set R deteriorates as the largest database into DB$_{bottom}$, 240, which requires the most time to accomplish face identification. Details of the MKL-FR module 1200 are illustrated below.

B. MKL Face Recognition Module of the Owner

With reference to FIG. 1, after the specific database layer is accessed from the PDAC module 1100, it can offer efficient identity matching with high dependency to further heighten face identification accuracy for the following MKL-FR module 1200. The MKL-FR module 1200 is implemented through the use of the personalized MKL classifier unit 1220 which uses the multiple-kernel learning (MKL) algorithm to achieve high-quality face identification. The MKL algorithm is well-known to those skilled in the art and it will not be further explained herein.

Figure 3A:
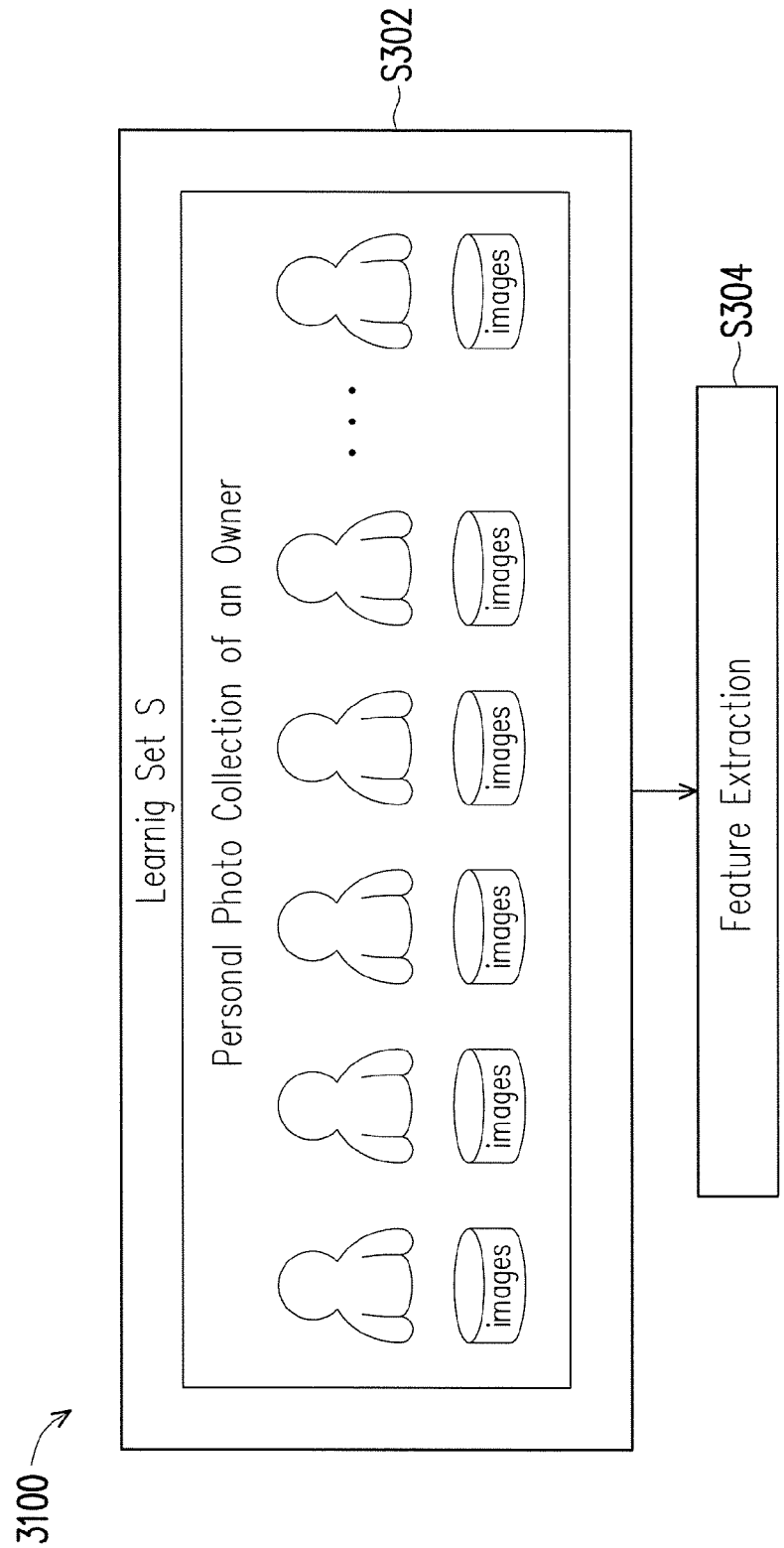
FIG. 3A to FIG. 3C are flowcharts illustrating a MKL classifier unit for face identification according to an embodiment of the invention.
Figure 3B:
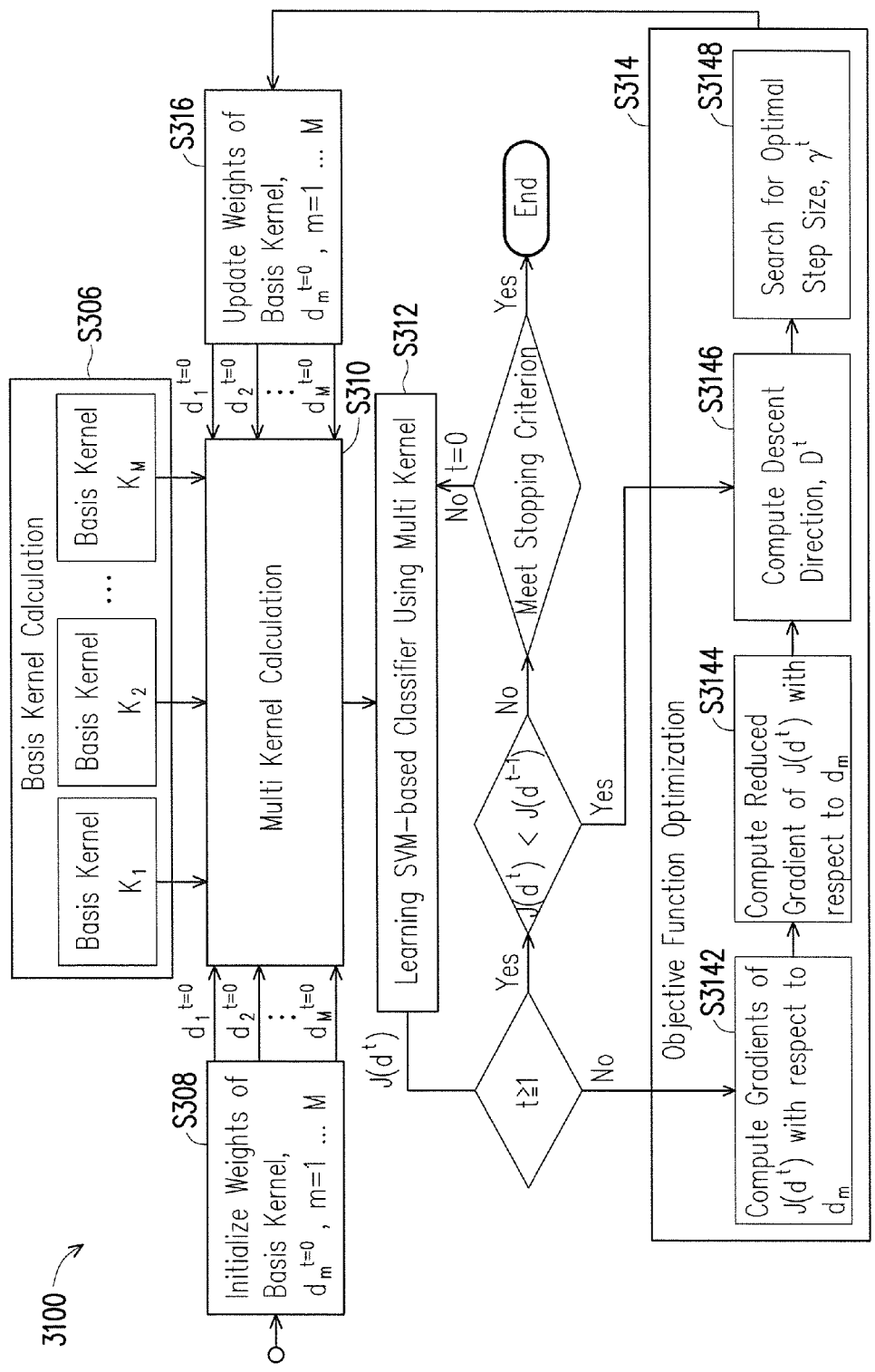
Figure 3C:
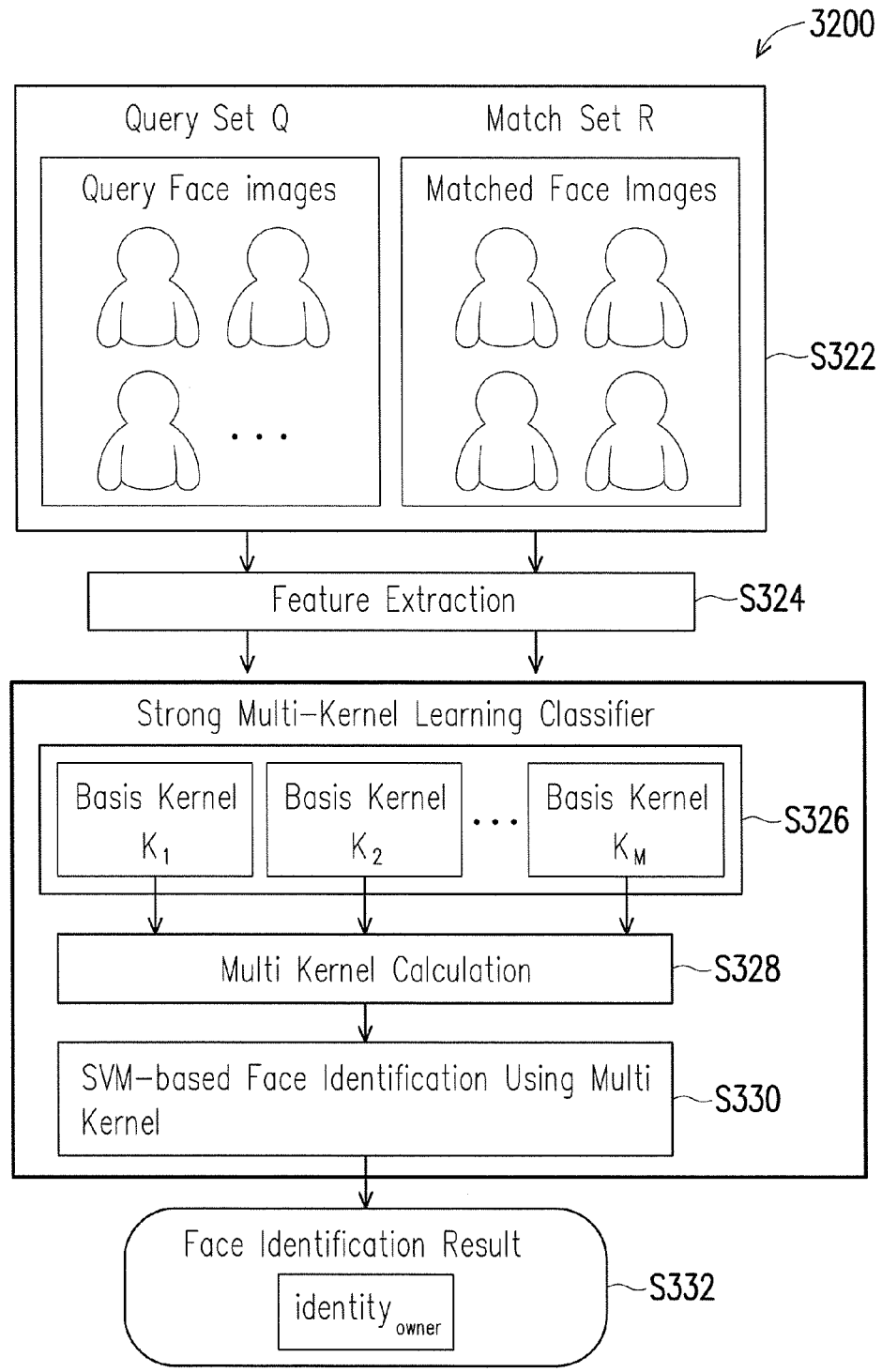

In order to achieve accurate face identification results in regard to the owner, the personalized MKL classifier unit 1220 is trained with the personalized database accessed in distributed OSNs. In other words, the personalized MKL classifier unit 1220 can be obtained by means of finding a set of multiple optimal weights by which to combine the suitable kernel functions with appropriate kernel parameters for local adaption to the current owner. FIG. 3A to FIG. 3C are flowcharts illustrating a MKL classifier unit for face identification according to an embodiment of the invention. With reference to FIG. 3A, FIG. 3B and FIG. 3C, two procedures including an offline learning procedure 3100 and an online recognition procedure 3200 are provided.

Offline Learning Procedure:

With reference to FIG. 1 and FIG. 3A, in order to acquire the personalized MKL classifier unit 1220 supported by support vector machine (SVM), the offline learning procedure 3100 with labelled face images extracted from personal photo collections based on social network context belonging to the current owner is exploited (step S302). By doing this, a set of optimal weights of basis kernels that can adapt to a specific owner are determined via the multiple-kernel learning algorithm. Consequently, the SVM-based personalized classifier can be trained and optimized by means of the linear combination of various basis kernels with the corresponding personalized optimal weights obtained from this offline learning procedure.

Given a learning set S of Ns labeled face images belonging to specific pose p, the corresponding identity labels are accessed in the fourth layer database DB$_{bottom}$ 240 which contains the labelled face images set F={FI$_{f,p}$|p∈P}$^{NF}_{f=1}$ from photo collections by using owner-specific social network context based on three characteristics of OSNs. FI$_{f,p}$ denotes the fth labelled face image, with a particular pose index p∈P estimated by the face detection algorithm. The face detection algorithm is well-known to those skilled in the art and it will not be further explained herein. The learning set S can be denoted as follows:

$$S=\{X,Y\}=\{x_i,y_i\}_{i=1}^{NS} \quad \text{Equation (7)}$$

wherein X={x$_i$}$^{NS}_{i=1}$⊂F denotes a learning image set containing N$_S$ face images with specific pose p which can be used to learn the personalized MKL classifier 1220 for specific pose p, and Y={y$_i$}$^{NS}_{i=1}$⊂Ω$_{bottom}$={1$_{owner}$, 1$_l$, . . . , 1$_L$} is the corresponding N$_S$ identity labels.

Prior to the learning procedure, face feature extraction plays an important role in expediting face identification tasks. The Principle Component Analysis (PCA) is a very effective and successful technique for dimensionality reduction in pattern recognition and face classification. As such, in step S304, PCA is adopted directly to extract global face features which are represented as the feature matrix V$_X$=[vx1 . . . vx$_{NS}$] composed of N$_S$ original feature vectors from all labeled face images on the whole learning image set X that aims to acquire the reduced feature vector dimensions while preserving the original visual information of face images for the following learning procedure.

Then, with reference to FIG. 3B, the offline learning procedure 3100 comprises the following processes:

(1) Initialization for Weights-of-Basis Kernels:

Standard SVM is able to train a classifier by employing a single kernel to measure the similarity between examples. Due to the diversity of individuals in OSNs, a SVM-based classifier with an adaptive and personalized multi kernels is provided to produce a highly reliable personalized MKL classifier.

Initially, various basis kernels {K$_m$}$^M_{m=1}$ are generated (step S306) to offer the following multi kernel calculation (step S310) which iteratively combines various basis kernels {K$_m$}$^M_{m=1}$ with the learned weights {d$_m^t$}$^M_{m=1}$ which are adaptive to the individuals. At the beginning of the learning procedure, the initial weights d$^{t=0}$={d$_m^{t=0}$}$^M_{m=1}$ of all M basis kernels are uniform, and are defined as follows (step S308):

$$d_m^{t=0} = \frac{1}{M}, \forall m \quad \text{Equation (8)}$$

wherein M is the total number of basis kernels depending on the number of kernel function types, kernel parameters, and dimensions of the original feature vector. In a MKL classifier unit, SVM is introduced to project the original feature vectors in dim$_{vx}$-space into a higher dimensional feature space by exploiting a feature map φ, after which a kernel function is defined as the measure of similarity between two arbitrary examples x, x' using the pairwise inner product and a kernel function, which can be expressed in the following form:

$$\text{ker}(x,x')=<\phi(x),\phi(x')> \quad \text{Equation (9)}$$

In order to achieve an effective classification performance, two commonly-used and accepted types of kernel function are adopted to accurately reflect the similarity value of taking advantage of a dot product through a pair of arbitrary examples x, x' as follows:

Gaussian RBF kernel function with parameter c:

$$ker(x, x') = \exp\left(-\frac{|x-x'|^2}{\sigma}\right), \sigma \in R \quad \text{Equation (10)}$$

Polynomial kernel function with parameter s:

$$\text{ker}(x,x')=(x^Tx'+\sigma)^s \text{ where } \sigma \text{ is a constant, } s\in R \quad \text{Equation (11)}$$

In particular, one of a set of multiple basis kernels {K$_m$}$^M_{m=1}$ can be denoted as follows:

$$K_m=[k_m(i,j)]_{N_s \times N_s}, \forall m \quad \text{Equation (12)}$$

wherein each component k$_m$(i, j)=ker (vx$_i$, vx$_j$) of each basis kernel can be obtained using Equations (10) and (11). Note that the dimension of each basis kernel Km is reliant on the total number of the original feature vectors extracted from the learning image set X.

(2) Multi Kernel Calculation:

In step S310, a MKL classifier unit personalized for a specific owner by which to be applied for high-quality face identification of diverse individuals in OSNs is used. The personalized MKL classifier unit can be obtained by means of learning the personalized multi kernel K from the personalized database of an owner. The following processes are executed at each round t. Next, multi kernel K is defined as the linear combination of a set of multiple basis kernels $\{K_m\}^M_{m=1}$ with the corresponding multiple weights $\{d_m^t\}^M_{m=1}$ of basis kernels, which can be combined in a weighted form as follows:

$$K = \sum_{m=1}^{M} d_m^t K_m, \ d_m^t \geq 0, \ \sum_{m=1}^{M} d_m^t = 1 \quad \text{Equation (13)}$$

wherein $K_m$ represents the mth basis kernel, $d_m^t$ represents the corresponding mth non-negative weight, and the summation of all non-negative weights $d_m^t$ is constrained to 1 in each round t.

In this learning procedure which features a personalized distributed database of the owner, each weight $d_m^t$ of the mth basis kernel assigned is higher when the corresponding basis kernel $K_m$ achieves better classification performance. Therefore, the personalized multi kernel K can provide the following SVM-based classifier with the best combination of basis kernels, and thereby produce the optimum SVM-based classifier for high-quality face identification for the current owner in distributed OSNs.

(3) Learning SVM-Based Classifier Using Multi Kernels:

In step S312, the SVM-based classifier learns and is optimized to boost the accuracy of face identification based on the personalization characteristics of OSNs. Hence, after the multi kernel is calculated, the personalized multi kernel K at each round t is used to further optimize the accuracy of the SVM-based classifier and produces a personalized MKL classifier unit for local adaptation to the current owner.

More specifically, the SVM-based classifier used for the personalized MKL classifier unit is able to find an optimal separate hyperplane in higher dimensional feature space with the maximum margin of separation while minimizing the misclassification error by the different personalized multi kernel K optimizations, and subsequently produces the corresponding optimal MKL decision function with high classification performance.

In this way, the MKL primal problem that can affect personalized SVM-based decisions is solved by the following optimization formulation:

$$\min\left\{\frac{1}{2}\sum_{m=1}^{M}\frac{1}{d_m^t}w_m^2 + C\sum_{i=1}^{N_a}\xi_i\right\} \quad \text{Equation (14)}$$

subjected to $$y_i\left(\sum_{m=1}^{M} w_m, \phi_m(vx_i) + b\right) \geq 1 - \xi_i, \ \forall \ i \quad \text{Equation (15)}$$

$$\xi_i \geq 0, \forall \ i \quad \text{Equation (16)}$$

$$\sum_{m=1}^{M} d_m^t = 1, \ d_m^t \geq 0, \ \forall \ m \quad \text{Equation (17)}$$

wherein the parameters $\{w_m\}$, b, $\xi$ are optimized with $d_m^t$ being fixed; $w_m$ and $d_m^t$ are respectively the parameter vector of the mth optimal partial decision function and the weight associated with the mth basis kernel; b is the bias term of the optimal decision function; the non-negative slack variable $\xi_i$ is introduced to cope with the misclassification error for each original feature vector $vx_i \in VX=[vx1 \ldots vx_{NS}]$; $y_i$ is the corresponding identity label; finally, the generalization of the SVM-based classifier is controlled by the hyperparameter C, which must be a fixed constant depending on the personalized pyramid database of the current owner. In brief, a larger value for the hyperparameter C will result in a higher assigned penalty of misclassification error. Note that all learned NS labelled face images originate from the personalized database in distributed OSNs.

(4) Objective Function Optimization for Personalized MKL Classifier:

In step S314, for optimization of the multi kernel K adapted to the current owner, the proposed personalized MKL classifier unit focuses on determining the set of optimal weights $\{d_m^t\}^M_{m=1}$ of basis kernels by minimizing the objective function $J(d^t)$ within the iterative learning process.

Herein, the subsequent updating of each weight of basis kernels is carried out in the following four main steps S3142~S3148. In step S3142 and step S3144, the gradient $[\nabla J]_m$ and the reduced gradient $[\nabla J_{red}]_m$ of $J(d^t)$ are computed with respect to $\{d_m^t\}^M_{m=1}$ as follows:

$$[\nabla J]_m = \frac{\partial J}{\partial d_m^t} = -\frac{1}{2}\sum_{i,j} a_i a_j y_i y_j K_m(i,j) \forall \ m \quad \text{Equation (18)}$$

$$[\nabla J_{red}]_m = \begin{cases} \frac{\partial J}{\partial d_m^t} - \frac{\partial J}{\partial d_\mu^t} & \forall \ m \neq \mu \\ \sum_{m \neq \mu} -[\nabla J_{red}]_m = \sum_{m \neq \mu} \frac{\partial J}{\partial d_m^t} - \frac{\partial J}{\partial d_\mu^t} & m = \mu \end{cases} \quad \text{Equation (19)}$$

where $\mu = \arg \max d_m^t$.

The objective function optimization process repeats the following steps at each round t until convergence difficulty is encountered, at which point the objective value stops decreasing.

In step S3146, the descent direction $D^t = \{D_m^t\}^M_{m=1}$ is computed with respect to $\{d_m^t\}^M_{m=1}$ to update all weights $\{d_m^t\}^M_{m=1}$ of basis kernels where $$D_m^t = \begin{cases} -[\nabla J_{red}]_m & \text{if } m \neq \mu \text{ and } d_m^t > 0 \\ 0 & \text{if } d_m^t = 0 \text{ and } [\Delta J_{red}]_m > 0 \\ \sum_{m \neq \mu} -D_m^t & \text{for } m = \mu \end{cases} \quad \text{Equation (20)}$$

Herein, the descent direction in a particular basis kernel is set to zero when the weight of the same basis kernel is zero and $[\nabla J_{red}]_m > 0$. Similarly, the descent direction in a particular basis kernel is set to $$\sum_{m \neq \mu} -D_m^t$$

when the weight of the corresponding basis kernel is the maximum over all weights.

The final step S3148 involves searching an optimal step size $\gamma^t$ along the descent direction $D^t=\{D_m^t\}_{m=1}^M$ by which to sufficiently minimize the objective function, which is calculated by minimizing $$-\frac{d_m^t}{D_m^t}$$

with respect to $D_m^t$ as follows:

$$\gamma^t = \min -\frac{d_m^t}{D_m^t}, \forall D_m^t < 0 \qquad \text{Equation (21)}$$

wherein $\gamma^t$ searches along the descent direction, which is less than zero, in order to facilitate an updating of the weight of particular basis kernels as zero to correspond to the largest reduced gradient with a negative descent direction.

(5) Update Weights of Basis Kernels:

Once the objective function optimization is processed, as shown in step S316, the corresponding set of the weight $d^{t+1}=\{d_m^{t+1}\}_{m=1}^M$ of basis kernels is updated at the next round t=t+1, so that the weight-updating scheme is expressed as follows:

$$d_m^{t+1} = d_m^t + \gamma^t D_m^t \forall m \qquad \text{Equation (22)}$$

The updated set of the weight $d^{t+1}=\{d_m^{t+1}\}_{m=1}^M$ of basis kernels is then forwarded to the multi kernel calculation (in step S310) which can again combine multiple basis kernels with the updated weights.

(6) Termination for Multiple-Kernel Learning:

The learning procedure is terminated when the stopping criterion is met in order to ensure global convergence. Likewise, if the predefined stopping criterion has not yet been met, the gradient and the reduced gradient of $J(d^t)$ are recomputed with respect to $\{d_m^t\}_{m=1}^M$ during the initial round. After terminating the learning process, the strong MKL classifier is completed through learning a personalized set of $\{\alpha_i\}_{i=1}^{NS}$ and $\{d_m^t\}_{m=1}^M$.

Online Learning Procedure:

The flowchart of the online recognition procedure 3200 for the MKL-FR module can be seen in FIG. 3C. As shown in step S322, in order to accomplish fast and accurate face identification, an online recognition procedure 3200 with the query set Q extracted from the set of personal photographs uploaded by the current owner is employed. In this procedure of the proposed personalized MKL classifier unit, the query set is identified from the personalized pyramid database unit based on the social network context of the current owner.

In step S324, the face feature extraction process of the online recognition procedure is the same as that of the offline learning procedure. PCA is used to independently extract the $N_Q$ and $N_R$ original face feature vectors from the query set Q and the match set R of all face images from the specific layer of the personalized pyramid database unit of the current owner.

These feature vectors are independently represented as the feature matrix $V_Q = [V_{q1} \ldots vq_{NQ}]$ and $V_R = [vx_1 \ldots vx_{NR}]$.

After the feature extraction is processed, the feature matrices of $V_Q$ and $V_R$ are simultaneously submitted to the strong MKL classifier of the owner. This recognition procedure in the strong MKL classifier of the owner is comprised of the following processes:

(1) Basis Kernel Calculation:

In step S326, for the recognition procedure, one of a set of multiple basis kernels $\{K_m\}_{m=1}^M$ $$K_m = [k_m(i,j)]_{N_Q \times N_R}, \forall m \qquad \text{Equation (23)}$$

wherein each component $k_m(I, j) = \text{ker}(vq_i, vx_j)$ of the mth basis kernel can be obtained by means of a dot product between a pair of $N_Q$ query feature vectors $vq_i \in V_Q$ and $N_R$ specific matching feature vectors $vx_j \in V_R$, which are all support vectors in the match set R with $\alpha_j > 0$, and $N_R \leq N_R$. That is, the dimension of each basis kernel $K_m$ in the recognition procedure is reliant on the number of all face images in the query set Q and specific face images in the match set R in order to achieve effective identification.

(2) Multi Kernel Calculation:

In step S328, the multi kernel calculation determines the optimal similarity measure via the linear combination of various basis kernels $\{K_m\}_{m=1}^M$ with the optimal set of personalized weights $\{D_m\}_{m=1}^M$ of basis kernels learned using Equation (13) from an obtained set of multiple basis kernels. In order to enhance the effectiveness of the personalized pyramid database unit that can offer efficient identity matching, the similarity between all pairs of face images in the query set by means of the calculated multi kernel K are measured. This value is based on the content information and can be further interpreted as the probability of first occurrence of each query face image. The identification of high-dependence query faces can benefit from the specific layer of database provided by the Non-First Batch of Access Control procedure 2300 when the corresponding similarities are high. Otherwise, the remaining query faces are regarded as first occurrence in the query set and can be thus identified by using all identities provided by the First Batch of Access Control procedure 2200. This leads to acceleration of the following processes and increases the accuracy of face identification.

(3) SVM-Based Face Identification Using Multi Kernel:

In the final process of the recognition procedure, as shown in step S330, a given query subset $Q' \subseteq Q$ with a particular pose index p is identified from the match set R with a similar pose index p through the MKL classifier unit of the current owner $H_{owner}$. Hence, the recognized class vector $\text{class}_{owner^*} = [\text{class}_{q,owner}^*]_{1 \times NQ'}^T$ is produced which consists of $N_{Q'}$ recognized classes along with the corresponding score vector $\text{score}_{owner} = [\text{score}_{q,owner}]_{1 \times NQ'}^T$, which can be obtained respectively as follows:

$$\text{class}_{owner^*} = H_{owner}(Q', R) = \arg \max_{class \in \Omega_{t=toner}} df_{class}(Q', R) \qquad \text{Equation (24)}$$

$$\text{score}_{owner^*} = \max_{class \in \Omega_{t=toner}} df_{class}(Q', R) \qquad \text{Equation (25)}$$

wherein $df_{class}$ denotes the MKL decision function corresponding to the specific class.

Finally, $\text{identity}_{owner} = [\text{identity}_{q,owner}]_{1 \times NQ'}^T$ denotes the returned identity vector of query subset Q' and it can be expressed as follows:

$$\text{identity}_{owner} = (H_{owner}(Q, R')) = I(\text{class}_{owner^*}) \qquad \text{Equation (26)}$$

Note that I(•) denotes an identity function that returns a set of identity labels when the recognized class vector class-$s_{owner}*$ is acquired for a query subset Q'. Let the superscript T denote the transposition of a vector.

After the face identification results are obtained by the personalized MKL classifier unit of the current owner, as shown in step 3232, the face identification results will be connected to the PDAC module 1100 to determine whether or not the identity labels of given query faces are correct. This is accomplished by the access control, which takes advantage of the threshold belonging to a certain recognized identity.

An efficient and effective personalized MKL classifier is produced by the multiple-kernel learning algorithm which optimizes the multi kernel adapted to a current owner by means of dynamically determining a set of optimal weights of basis kernels. This is accomplished by using the personal photo collections of the owner via the personalization characteristics of OSNs. In addition, the SVM-based classifier finds suitable images for face identification from a large number of real-life face images in OSNs by taking advantage of the adaptive and personalized multi kernel and thereby facilitating face annotation performance.

C. MKL Face Recognition Fusion Module

With reference to FIG. 1, the FRF module 1300 is designed to perform the collaborative face recognition strategy by utilizing a user who features a highest priority rule within the collaborative face recognition framework based on the distribution characteristic of OSNs to achieve high-accuracy automatic face annotation system.

Due to the fact that the collaborative face recognition strategy employs the owner who has a highest priority, the MKL-FR module 1200 of the owner is first applied to face identification based on the personalization and socialization of OSNs. If the MKL-FR module 1200 of the owner cannot identify query faces, then the FRF module 1300 is utilized. In other words, a personalized MKL classifier unit of the current owner can first be adopted to determine the identity labels of given query faces, and the FRF module 1300 is configured to identify query faces when they cannot be correctly recognized by the personalized MKL classifier unit of the current owner. In the FRF module 1300, the selected proper personalized MKL classifier units belonging to specific members who are highly associated the current owner are used to identify misclassified individuals. These misclassified individuals are not likely to be socially connected to the owner but are likely to be highly socially connected to specific members who are highly associated with the owner.

Figure 4A:
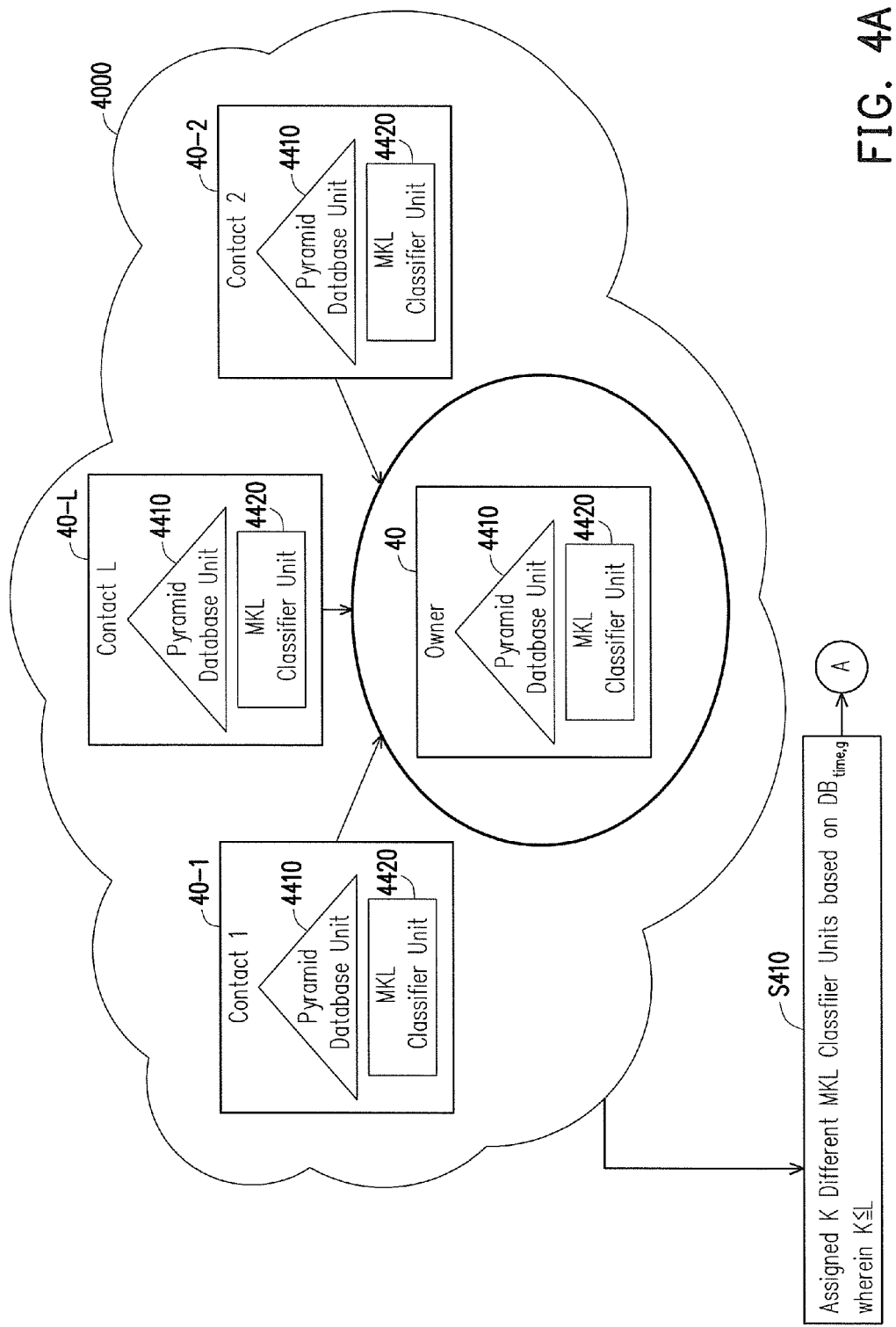
FIG. 4A and FIG. 4B are block diagrams illustrating two procedures performed by the FRF module according to an embodiment of the invention.
Figure 4B:
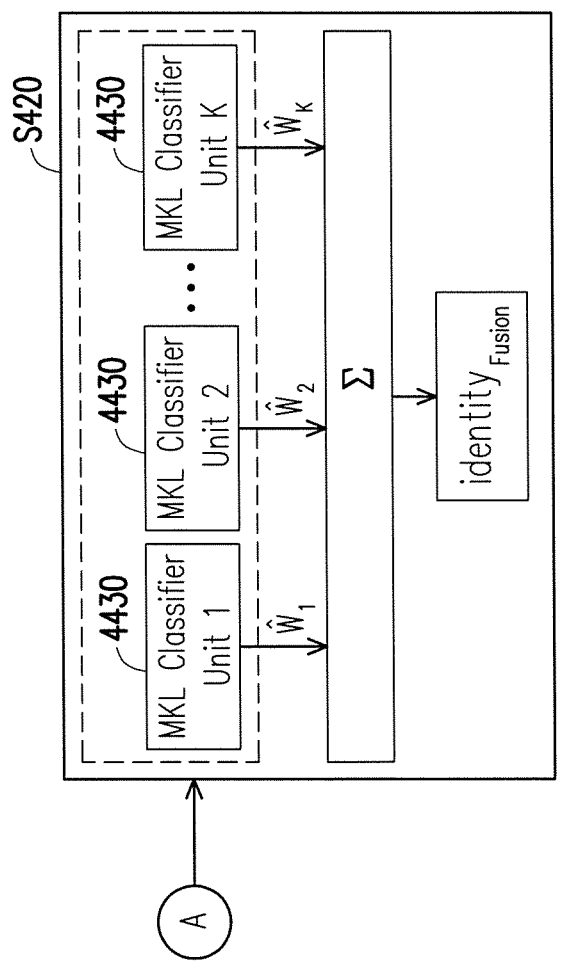

FIG. 4A and FIG. 4B are block diagrams illustrating two procedures performed by the FRF module 1300 according to an embodiment of the invention. With reference to FIG. 4A and FIG. 4B, in the collaborative face recognition framework for the current owner, each member (e.g. contact 40-1~40-L) has one personalized MKL classifier unit 4420 and one personalized pyramid database unit 4410 shared on distributed OSN 4000. Herein, the FRF module 1300 can be divided into two major procedures: selection of proper multiple MKL classifiers, and fusion of multiple face identification results. Details of the two major procedures are described below.

(1) Selection of Proper Multiple MKL Classifiers

With reference to FIG. 4A and FIG. 4B, the first procedure of the proposed FRF module 1300 involves the selection of a set of proper K personalized MKL classifier units 4430, as shown in step S410. This is accomplished through the specific layer of constructed database $DB_{time,g}$ in the personalized pyramid database 4410 by using temporal-group context from personal collections of the current owner 40.

In other words, these proper K personalized MKL classifier units 4430 are selected out of L different personalized MKL classifier units 4420 belonging to all contacts 40-1~40-L of the current owner 40 that are able to correctly identify particular query face images within the collaborative face recognition framework.

Suppose that $Q'_{unrec}$ denotes the unrecognized query subset containing $N_{Q'unrec}$ particular query face images which are defined as unrecognized faces. In order to avoid identifying particular $N_{Q'unrec}$ query faces with a large number of identities, each selected personalized MKL classifier unit 4430 within a total of K personalized MKL classifier units is simultaneously and independently assigned to access the specific layer of constructed database $DB_{time}$ from the corresponding personalized pyramid database unit as each math set $\{R_k\}_{k=1}^K$ by which to dramatically reduce the time required for efficient collaborative face recognition. Hence, each one of the selected K personalized MKL classifier units 4430 is allowed to return a set of face identification results during the first procedure of the FRF module 1300.

(2) Fusion of Multiple Face Identification Results

With reference to FIG. 4B, after the proper personalized MKL classifier unit 4430 is selected, the proposed fusion solution is used to adeptly merge the returned selected K face identification results and thereby boost face annotation accuracy in distributed OSNs, as shown in step S420. Each face identification result including the recognized class vector $class_k* = [class_{q,k}*]^T_{1 \times NQ'unrec}$ and the score vector $score_k = [score_{q,k}*]^T_{1 \times NQ'unrec}$ is generated and returned by the corresponding selected personalized MKL classifier unit during the first procedure of the FRF module 1300. The set of K score vectors $\{score_k\}_{k=1}^K$ are converted into the corresponding set of confidence-based weight vectors $\{\hat{w}_k\}_{k=1}^K$; $\hat{w}_k = [\hat{w}_{q,k}]^T_{1 \times NQ'unrec}$ denotes the weight vector which is converted by taking advantage of the score vector $score_k = [score_{q,k}]^T_{1 \times NQ'unrec}$ obtained from the personalized MKL classifier unit $H_k$ of the kth highly connected member based on the temporal group context; finally, each component $\hat{w}_{q,k}$ represents the confidence level of the face identification result for the qth query face image in the unrecognized query subset $Q'_{unrec}$ obtained through the specific personalized MKL classifier units $H_k$ (k=1, . . . , K) within our collaborative face recognition framework. Subsequently, each weight component $\hat{w}_{q,k}$ related to the corresponding $score_{q,k}$ can be defined as follows:

$$\hat{w}_{q,k} = w_{q,k} \cdot (1 + \delta_3 \cdot CS_k) \forall k \text{ for } q=1,\ldots,N_{Q'unrec} \quad \text{Equation (27)}$$

wherein $CS_k$ represents the normalized connection score described in Equation (1), which belongs to the kth member accessed from the identity label subset $\Omega_{time,g}$; $\delta_3$ ($0 \le 3 \le 1$) is a constant which reflects the significance of social connection with respect to the probability $\hat{w}_{q,k}$ of correct classification. The probability of correct identification $\hat{w}_{q,k}$ for the qth query face images in the unrecognized query subset $Q'_{unrec}$ from the specific personalized MKL classifier units $H_k$ (k=1, . . . , K) is transformed by utilizing the summation normalization method as follows:

$$w_{y,k} = \text{prob}(identity_{q,k} = T(FI_{q,p})) = \frac{score_{e,k}}{\sum_{k=1}^{K} score_{q,k}} \forall k \text{ for } q = 1, \ldots, N_{Q'unrec} \quad \text{Equation (28)}$$

wherein $$\sum_{j=1}^{K} w_i = 1$$

and $T(FI_{q,p})$ denotes the identity of the qth query face image with a particular pose p.

Eventually, all K face identification results are integrated by employing the set of confidence-based weight vectors $\{\hat{w}_{q,k}\}^{K}_{k=1}$. The recognized class $class_{Fusion}*=[class_{Fusion}*]^{T}_{1 \times NQ'unrec}$ of adept fusion can then be obtained by determining the maximum of fusion score $$\sum_{k=1}^{K} \hat{w}_k \cdot H_k(Q'_{unrec}, R_k),$$

which is expressed as follows:

$$class_{Fusion} * = \arg\max_{k} \sum_{k=1}^{K} \hat{w}_k \cdot H_k(Q'_{unrec}, R_k) \quad \text{Equation (29)}$$

In order to perform face annotation on query face images, the identity vector $identity_{Fusion}=[identity_{Fusion}*]^{T}_{1 \times NQ'unrec}$ of adept fusion can be returned in accordance with the corresponding recognized class vector $class_{Fusion}*=[class_{Fusion}*]^{T}_{1 \times NQ'unrec}$, which can be expressed as follows:

$$identity_{Fusion} * = FRF(Q'_{unrec}) = \quad \text{Equation (30)}$$
$$I(class_{Fusion} *) = I\left(\arg\max_{k}\sum_{k=1}^{K} \hat{w}_k \cdot H_k(Q'_{unrec}, R_k)\right)$$

Note that $I(\cdot)$ denotes an identity function that returns a set of identity labels when the recognized class vector $class_{Fusion}*$ is acquired for a query subset $Q'_{unrec}$.

To sum up, according to the face annotation method and the automatic face annotation system provided in an embodiment of the invention, the face annotation approach used within a collaborative framework takes advantage of OSN characteristics, social network context, and the multiple-kernel learning algorithm, and involves three dominant modules: the PDAC module, the MKL-FR module, and the FRF module which employs a collaborative face recognition strategy based on the highest priority rule of the current owner. Initially, the unique multi-layer pyramid database architecture of each member in the PDAC module benefits the following MKL-FR module by facilitating efficient identification of query faces through focusing on a smaller number of identities that have high contextual dependences. This is determined through exploitation of various types of social network context including temporal context, group context, recurrence context, and temporal-group context associated with each member of a distributed OSN. As a result, its application can drastically reduce time consumption and further significantly improve the accuracy of subsequent face identification. Next, to accomplish face identification with optimal accuracy, the MKL-FR module utilizes the multiple-kernel learning algorithm with which to train and optimize the personalized MKL classifier unit for local adaptation to the current owner by means of a linear combination of various basis kernels with the optimal set of personalized weights. Finally, the FRF module is proposed by utilizing a user who features a highest priority rule by which to efficiently select the proper personalized MKL classifier units by utilization of temporal-group context. The multiple results of the personalized MKL classifier units are then fused within our collaborative framework of the distributed OSN and used to achieve highly reliable face annotation.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A face annotation method adapted for a current owner to annotate contacts in online social networks (OSNs), the face annotation method comprising:
    providing a pyramid database access control (PDAC) module which consists of a plurality of pyramid database units and performs a first batch of access control procedure and a non-first batch of access control procedure, wherein the pyramid database unit includes a plurality layers of database and is constructed according to social relationship information;
    providing a multiple-kernel learning face recognition (MKL-FR) module of the current owner implemented through the use of a MKL classifier unit which uses a MKL algorithm to achieve a face identification, wherein the MKL classifier unit is trained with the pyramid database unit accessed in OSNs and includes an offline learning procedure and an online recognition procedure; and
    if the MKL-FR model is not able to identify query faces, providing a multiple-kernel learning face recognition fusion (FRF) module to perform a collaborative face recognition strategy by utilizing a user who features a highest priority rule within a collaborative face recognition framework based on characteristics of OSNs.

2. The face annotation method as recited in claim 1, wherein the social relationship information includes a plurality types of social network context information including a recurrence context, a temporal context, a group context, and a temporal-group context.

3. The face annotation method as recited in claim 2, wherein the pyramid database unit includes four layers of database, wherein a first layer is based on the recurrence context, a second layer is based on the temporal context or the temporal-group context, a third layer is based on the group context, and a fourth layer contains all face images of contacts and the current owner.

4. The face annotation method as recited in claim 1, wherein the step of constructing the pyramid database unit comprises:
    evaluating a strength of recent social relationships between each contact and the current owner and normalizing a connection score,
    wherein the connection score is calculated by an equation which reflects the connection strength between contacts during a recent time period, and is evaluated by incorporating two main considerations including an unidirectional connection function and a bidirectional connection function,
    wherein the unidirectional connection function estimates the distribution of likelihoods of each contact occurring in recent personal photographs of the current owner, and the bidirectional connection function estimates the distribution of likelihoods of each contact and the current owner co-occurring in the recent personal photographs in the entire OSN.

5. The face annotation method as recited in claim 4, wherein the step of constructing the pyramid database unit further comprises:

when all identities of larger-size specific identity subsets have been sorted in accordance with the normalized connection score, an appropriate number of selected identities from the larger-size specific identity subsets to generate smaller-size identities are determined based on an optimum threshold by exploiting social network context types associated with a temporal context and a temporal-group context.

6. The face annotation method as recited in claim 1, wherein the first batch of access control procedure includes enabling the MKL classifier unit to access a specific layer of the pyramid database unit in order of priority based on the social relationship information.

7. The face annotation method as recited in claim 1, wherein the first batch of access control procedure further includes:

a match set of all face images belonging to the identity label subset corresponding to a temporal context of the pyramid database unit is first accessed and forwarded to the MKL classifier unit of the current owner for the face identification;

after the results of the face identification are returned, if a score vector exceeds a class threshold, an first access control is labelled with 1, which indicates that the identity of corresponding query face images needs to be annotated as recognized; and otherwise, the first access control is labelled with 0, which indicates that the first batch of access control procedure has to provide the MKL classifier unit of the current owner with the match set of face images of the next layer identity label subset that has been constructed to identify query faces again.

8. The face annotation method as recited in claim 7, wherein the first batch of access control procedure further includes:

if the identity label subset corresponding to a bottom layer of the pyramid database unit has been accessed and the first access control is still labeled with 0, then misclassified query face images are defined as unrecognized.

9. The face annotation method as recited in claim 7, wherein the first batch of access control procedure further includes:

after the face annotation process is completed, a query subset that has been annotated and its corresponding identity label subset are simultaneously submitted to a first layer of the database and acquire the specific groups mapped to these identities.

10. The face annotation method as recited in claim 1, wherein the non-first batch of access control procedure includes:

when a remaining query subset composed of the remainder of unlabeled face images is determined, the non-first batch of access control procedure allows the MKL classifier unit to access a specific layer of the entire pyramid database unit in the order of priority based on the social relationship information;

the non-first batch of access control procedure is executed to provide the match set and forwarded to the MKL classifier unit of the current owner;

when recognized classes are returned, an second access controls are labeled with 1, denoting that the acquired query identity labels are the correct results;

otherwise, the second access controls are labeled with 0; and the match set deteriorates as the largest database into a bottom layer of the pyramid database unit after other layers of the pyramid database unit have been accessed.

11. The face annotation method as recited in claim 1, wherein the FRF module performs a selection of proper multiple MKL classifiers units and a fusion of multiple face identification results, wherein the proper multiple MKL classifier units are selected out of different personalized MKL classifier units belonging to all contacts of the current owner that are able to identify particular query face images within the collaborative face recognition framework.

12. The face annotation method as recited in claim 11, wherein the selection of proper multiple MKL classifiers units is performed through a specific layer of constructed database in the pyramid database unit by using a temporal-group context from personal collections of the current owner.

13. The face annotation method as recited in claim 12, wherein the fusion of multiple face identification results is performed to merge the returned selected face identification results.

14. A face annotation system for a current owner to annotate contacts in online social networks (OSNs), the face annotation system comprising:

a pyramid database access control (PDAC) module, consisting of a plurality of pyramid database units and performing a first batch of access control procedure and a non-first batch of access control procedure, wherein the pyramid database unit includes a plurality layers of database and is constructed according to social relationship information; and a multiple-kernel learning face recognition (MKL-FR) module of the current owner implemented through the use of a MKL classifier unit, using a MKL algorithm to achieve a face identification, wherein the MKL classifier unit is trained with the pyramid database unit accessed in OSNs and includes an offline learning procedure and an online recognition procedure.

15. The face annotation system as recited in claim 14, if the MKL-FR model is not able to identify query faces, the face annotation system further includes:

a multiple-kernel learning face recognition fusion (FRF) module, performing a collaborative face recognition strategy by utilizing a user who features a highest priority rule within a collaborative face recognition framework based on characteristics of OSNs.

16. The face annotation system as recited in claim 15, wherein the FRF module performs a selection of proper multiple MKL classifiers units and a fusion of multiple face identification results, wherein the proper multiple MKL classifier units are selected out of different personalized MKL classifier units belonging to all contacts of the current owner that are able to identify particular query face images within the collaborative face recognition framework.

17. The face annotation system as recited in claim 16, wherein the FRF module performs the selection of proper multiple MKL classifiers units through a specific layer of constructed database in the pyramid database unit by using a temporal-group context from personal collections of the current owner.

18. The face annotation method as recited in claim 17, wherein the FRF module performs the fusion of multiple face identification results to merge the returned selected face identification results.

19. The face annotation system as recited in claim 14, wherein the social relationship information includes a plurality types of social network context information including a recurrence context, a temporal context, a group context, and a temporal-group context.

20. The face annotation system as recited in claim 19, wherein the pyramid database unit includes four layers of database, wherein a first layer is based on the recurrence context, a second layer is based on the temporal context or the temporal-group context, a third layer is based on the group context, and a fourth layer contains all face images of contacts and the current owner.

21. The face annotation system as recited in claim 14, wherein the pyramid database unit is constructed by evaluating a strength of recent social relationships between each contact and the current owner and normalizing a connection score,
wherein the connection score is calculated by an equation which reflects the connection strength between contacts during a recent time period, and is evaluated by incorporating two main considerations including an unidirectional connection function and a bidirectional connection function,
wherein the unidirectional connection function estimates the distribution of likelihoods of each contact occurring in recent personal photographs of the current owner, and the bidirectional connection function estimates the distribution of likelihoods of each contact and the current owner co-occurring in the recent personal photographs in the entire OSN.

22. The face annotation system as recited in claim 21, wherein when all identities of larger-size specific identity subsets have been sorted in accordance with the normalized connection score, the pyramid database unit is constructed by determining an appropriate number of selected identities from the larger-size specific identity subsets to generate smaller-size identities based on an optimum threshold by exploiting social network context types associated with a temporal context and a temporal-group context.

23. The face annotation system as recited in claim 14, wherein the PDAC module enables the MKL classifier unit to access a specific layer of the pyramid database unit in order of priority based on the social relationship information.

24. The face annotation system as recited in claim 14, wherein the PDAC module accesses and forwards a match set of all face images belonging to the identity label subset corresponding to a temporal context of the pyramid database unit to the MKL classifier unit of the current owner for the face identification,
after the results of the face identification are returned, if a score vector exceeds a class threshold, the PDAC module labels an first access control with 1, which indicates that the identity of corresponding query face images needs to be annotated as recognized; and
otherwise, the PDAC module labels the first access control with 0, which indicates that the first batch of access control procedure has to provide the MKL classifier unit of the current owner with the match set of face images of the next layer identity label subset that has been constructed to identify query faces again.

25. The face annotation system as recited in claim 24, wherein if the identity label subset corresponding to a bottom layer of the pyramid database unit has been accessed and the first access control is still labelled with 0, then the PDAC module defines misclassified query face images as unrecognized.

26. The face annotation system as recited in claim 24, wherein after the face annotation process is completed, the PDAC module simultaneously submits a query subset that has been annotated and its corresponding identity label subset to a first layer of the database and acquire the specific groups mapped to these identities.

27. The face annotation system as recited in claim 14, wherein when a remaining query subset composed of the remainder of unlabeled face images is determined, the PDAC module performs the non-first batch of access control procedure to allow the MKL classifier unit to access a specific layer of the entire pyramid database unit in the order of priority based on the social relationship information, and the PDAC module executes the non-first batch of access control procedure to provide the match set and forwarded to the MKL classifier unit of the current owner, and when recognized classes are returned, the PDAC module labels an second access controls with 1, denoting that the acquired query identity labels are the correct results; otherwise, the PDAC module labels the second access controls with 0,
wherein the match set deteriorates as the largest database into a bottom layer of the pyramid database unit after other layers of the pyramid database unit have been accessed.

* * * * *